(12) United States Patent
Himelfarb et al.

(10) Patent No.: US 12,132,860 B2
(45) Date of Patent: *Oct. 29, 2024

(54) CONDITIONAL COMMUNICATION FORWARDING BASED ON ORIGINATION AND DESTINATION ATTRIBUTES

(71) Applicant: FIRST ORION CORP., North Little Rock, AR (US)

(72) Inventors: Mark Himelfarb, Little Rock, AR (US); Timothy Stalnaker, Conway, AR (US)

(73) Assignee: FIRST ORION CORP., North Little Rock, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,873

(22) Filed: Jan. 30, 2023

(65) Prior Publication Data

US 2023/0171342 A1 Jun. 1, 2023

Related U.S. Application Data

(63) Continuation of application No. 16/993,088, filed on Aug. 13, 2020, now Pat. No. 11,570,297.

(51) Int. Cl.
*H04M 3/20* (2006.01)
*H04M 3/22* (2006.01)
(Continued)

(52) U.S. Cl.
CPC ..... *H04M 3/42068* (2013.01); *H04M 3/2272* (2013.01); *H04M 3/53391* (2013.01)

(58) Field of Classification Search
CPC . H04L 65/1104; H04L 1/0002; H04L 51/214; H04L 65/1069; H04L 65/1076; H04L 65/1101; H04L 65/401; H04L 67/125; H04L 67/54; H04M 1/665; H04M 1/72436; H04M 3/20; H04M 3/2272; H04M 3/42042; H04M 3/42059; H04M 3/42068; H04M 3/42093; H04M 3/42382; H04M 3/436; H04M 3/4365; H04M 3/53391; H04M 15/06; H04M 1/2473; H04M 1/2535; H04M 1/57; H04M 1/6066; H04M 1/663;

(Continued)

(56) References Cited

U.S. PATENT DOCUMENTS

| 5,243,641 | A | * | 9/1993 | Evans | H04W 84/16 455/555 |
| 5,790,635 | A | * | 8/1998 | Dezonno | H04M 3/2272 379/267 |

(Continued)

FOREIGN PATENT DOCUMENTS

CN 106791051 A 5/2017

*Primary Examiner* — Gerald Gauthier

(57) ABSTRACT

One example method of operation may include one or more of identifying an incoming call via a communication processing device, terminating the incoming call at a call management device, identifying one or more caller attributes received with the incoming call, comparing the one or more caller attributes to one or more call recipient preferences stored in a call recipient profile, and transmitting a notification, via the call management device, to a call recipient device based on the one or more caller attributes and the one or more call recipient preferences.

17 Claims, 9 Drawing Sheets

(51) Int. Cl.

*H04M 3/42* (2006.01)
*H04M 3/533* (2006.01)

(58) Field of Classification Search

CPC ...... H04M 1/724; H04M 3/22; H04M 3/2281; H04M 3/42178; H04M 3/428; H04M 3/527; H04M 3/5183; H04M 3/53308; H04M 3/54; H04M 7/0054; H04M 7/0078; H04W 4/16; H04W 40/00; H04W 4/02; H04W 8/12; H04W 12/06; H04W 52/0229; H04W 76/15; H04W 84/16; H04B 17/391; H04J 3/1682; H04J 3/1694

See application file for complete search history.

(56) References Cited

U.S. PATENT DOCUMENTS

| | | | |
|---|---|---|---|
| 5,930,338 A * | 7/1999 | McKendry | H04M 1/663 379/88.01 |
| 6,240,168 B1 * | 5/2001 | Stanford | H04M 1/2473 379/93.19 |
| 6,327,342 B1 * | 12/2001 | Mobley | H04M 3/22 379/47 |
| 6,445,937 B1 * | 9/2002 | daSilva | H04W 52/0229 455/574 |
| 6,574,470 B1 * | 6/2003 | Chow | H04W 76/15 455/554.1 |
| 6,678,515 B1 * | 1/2004 | Gillespie | H04M 3/42068 455/445 |
| 6,944,444 B1 * | 9/2005 | Gillespie | H04M 3/54 379/212.01 |
| 7,903,808 B2 | 3/2011 | Itoh | |
| 8,000,455 B1 | 8/2011 | Haaften et al. | |
| 8,027,436 B1 * | 9/2011 | Hursey | H04M 3/42178 379/221.09 |
| 8,315,646 B2 * | 11/2012 | Karjalainen | H04W 4/02 455/552.1 |
| 8,358,999 B1 * | 1/2013 | Vu | H04W 4/16 455/500 |
| 8,605,875 B2 * | 12/2013 | Burchard | H04M 3/42093 379/142.1 |
| 8,644,471 B1 | 2/2014 | Peden et al. | |
| 8,681,968 B2 * | 3/2014 | Vendrow | H04W 40/00 379/211.01 |
| 8,744,060 B2 | 6/2014 | Ramanathan et al. | |
| 8,913,994 B2 | 12/2014 | Edwards et al. | |
| 8,948,821 B2 | 2/2015 | Newham et al. | |
| 9,900,431 B1 * | 2/2018 | Kreiner | H04M 1/665 |
| 10,616,411 B1 * | 4/2020 | Chang | H04M 3/2281 |
| 10,868,910 B1 * | 12/2020 | Massie | H04M 3/5183 |
| 11,005,992 B1 * | 5/2021 | Chang | H04M 3/436 |
| 11,570,297 B2 * | 1/2023 | Himelfarb | H04M 3/4365 |
| 2001/0028711 A1 | 10/2001 | Antonucci et al. | |
| 2002/0132585 A1 * | 9/2002 | Palermo | H04M 1/6066 455/73 |
| 2003/0039344 A1 * | 2/2003 | Mercer | H04M 1/57 379/142.01 |
| 2003/0086432 A1 * | 5/2003 | Bartfeld | H04M 3/53308 370/401 |
| 2003/0198209 A1 * | 10/2003 | Schwengler | H04L 1/0002 370/335 |
| 2003/0233429 A1 * | 12/2003 | Matte | H04L 67/125 340/541 |
| 2004/0146048 A1 * | 7/2004 | Cotte | H04L 65/1101 370/352 |
| 2004/0148340 A1 * | 7/2004 | Cotte | H04L 65/401 709/203 |
| 2004/0148341 A1 * | 7/2004 | Cotte | H04L 65/401 709/219 |
| 2004/0148342 A1 * | 7/2004 | Cotte | H04L 65/1069 709/203 |
| 2004/0148351 A1 * | 7/2004 | Cotte | H04L 65/1069 709/205 |
| 2004/0148392 A1 * | 7/2004 | Cotte | H04M 7/0054 709/225 |
| 2005/0008135 A1 | 1/2005 | Bressler | |
| 2005/0163299 A1 * | 7/2005 | Creamer | H04M 3/42042 379/142.04 |
| 2005/0265277 A1 * | 12/2005 | Thadasina | H04J 3/1682 370/328 |
| 2006/0062377 A1 | 3/2006 | Itoh | |
| 2006/0246887 A1 * | 11/2006 | Barclay | H04B 17/391 455/67.11 |
| 2006/0258287 A1 * | 11/2006 | Bidet | H04L 51/214 455/41.2 |
| 2007/0036347 A1 * | 2/2007 | Teicher | H04M 1/724 379/418 |
| 2007/0064886 A1 * | 3/2007 | Chiu | H04M 1/2535 379/88.17 |
| 2007/0189481 A1 | 8/2007 | Cadiz et al. | |
| 2007/0201648 A1 | 8/2007 | Miller et al. | |
| 2008/0139170 A1 * | 6/2008 | Kahn | H04M 3/42042 455/406 |
| 2008/0205608 A1 * | 8/2008 | Tal | H04M 3/527 379/93.01 |
| 2008/0293392 A1 | 11/2008 | Strother | |
| 2008/0293409 A1 * | 11/2008 | Gillot | H04W 8/12 455/433 |
| 2009/0086950 A1 | 4/2009 | Vendrow et al. | |
| 2009/0086952 A1 | 4/2009 | Geppert et al. | |
| 2009/0086953 A1 * | 4/2009 | Vendrow | H04W 40/00 379/207.02 |
| 2009/0141879 A1 | 6/2009 | Knight | |
| 2009/0310768 A1 * | 12/2009 | Hansen | H04M 3/436 379/201.02 |
| 2009/0317087 A1 * | 12/2009 | Bernard | H04J 3/1694 398/135 |
| 2010/0061532 A1 | 3/2010 | Takiguchi | |
| 2010/0329438 A1 | 12/2010 | Yang et al. | |
| 2011/0002454 A1 * | 1/2011 | Sanmugasuntharam | H04M 3/42059 379/142.06 |
| 2011/0013760 A1 | 1/2011 | Martino et al. | |
| 2011/0135075 A1 | 6/2011 | Hubner et al. | |
| 2012/0102150 A1 * | 4/2012 | Wang | H04L 67/54 709/224 |
| 2012/0208505 A1 * | 8/2012 | Teng | H04W 12/06 455/411 |
| 2013/0003954 A1 * | 1/2013 | Vendrow | H04M 7/0033 379/201.01 |
| 2013/0150032 A1 * | 6/2013 | Pattaswamy | H04W 52/0229 455/434 |
| 2013/0156177 A1 * | 6/2013 | Theivendran | H04M 3/428 379/215.01 |
| 2014/0066024 A1 | 3/2014 | Lee et al. | |
| 2015/0054910 A1 * | 2/2015 | Offen | H04M 3/20 348/14.02 |
| 2015/0156616 A1 * | 6/2015 | McComb | H04M 3/42068 455/417 |
| 2015/0304490 A1 | 10/2015 | Huang et al. | |
| 2016/0173681 A1 | 6/2016 | Youst | |
| 2016/0182716 A1 * | 6/2016 | Tatourian | H04M 3/42042 455/414.1 |
| 2016/0212266 A1 | 7/2016 | Soundar | |
| 2016/0234381 A1 * | 8/2016 | Alfano | H04M 1/72436 |
| 2018/0054514 A1 * | 2/2018 | Gosselin | H04M 3/42382 |
| 2018/0152558 A1 * | 5/2018 | Chan | H04W 4/16 |
| 2019/0116262 A1 * | 4/2019 | Borukhoff | H04L 65/1076 |
| 2019/0174000 A1 * | 6/2019 | Bharrat | H04M 3/42059 |
| 2019/0394328 A1 * | 12/2019 | Agarwal | H04L 65/1104 |
| 2020/0053209 A1 | 2/2020 | Kats et al. | |
| 2020/0084318 A1 * | 3/2020 | Amin | H04M 7/0078 |
| 2020/0092724 A1 * | 3/2020 | Stubblefield | H04W 4/16 |
| 2020/0213443 A1 * | 7/2020 | Synal | H04M 3/42059 |
| 2021/0075907 A1 * | 3/2021 | Murphy | H04M 15/06 |
| 2021/0075908 A1 * | 3/2021 | Murphy | H04M 3/42042 |
| 2021/0144246 A1 * | 5/2021 | Murphy | H03M 3/436 |
| 2021/0203779 A1 | 7/2021 | Piscopo, Jr. et al. | |
| 2021/0243296 A1 * | 8/2021 | Garg | H04M 3/42042 |
| 2021/0344793 A1 | 11/2021 | Kats et al. | |

(56) References Cited

U.S. PATENT DOCUMENTS

2022/0053088 A1\* 2/2022 Himelfarb ............ H04M 3/4365
2022/0053301 A1\* 2/2022 Himelfarb ......... H04M 3/42059
2023/0171342 A1\* 6/2023 Himelfarb ......... H04M 3/42042
  379/70

\* cited by examiner

CONDITIONAL COMMUNICATION FORWARDING BASED ON ORIGINATION AND DESTINATION ATTRIBUTES

CROSS-REFERENCE TO RELATED APPLICATIONS

This application is a continuation of U.S. non-provisional patent application Ser. No. 16/993,088, filed on Aug. 13, 2020, now U.S. Pat. No. 11,570,297, issued on Jan. 31, 2023, the entire contents of which is incorporated herein by reference.

This application is related to U.S. non-provisional patent application Ser. No. 16/993,022, filed on Aug. 13, 2020, now U.S. Pat. No. 11,722,861, issued on Aug. 8, 2023, entitled, "CONDITIONAL COMMUNICATION FORWARDING BASED ON ORIGINATION AND DESTINATION ATTRIBUTES," the entire contents of which is incorporated herein by reference.

BACKGROUND

Conventionally, mobile device users receive calls from undesired sources every day and sometimes several times an hour depending on the particular day. The source numbers which are used to dial the users may be local numbers, long-distance numbers, anonymous numbers, spoofed numbers, etc. The calls may be spam calls, scam calls, robocalls, etc. With recent updates to smartphones and the call screen user interfaces used during a call, the sources of the calls are generally displayed in some capacity to permit the user to identify whether to answer the phone call or not, such as caller ID or other data services indicating a name and/or location origin of the number assigned to the caller. However, in the event that the number is not known to the caller or is matched to his or her previously stored contacts, the caller may require additional information to be shared to demonstrate credibility as a reputable service or advertisement and not just some arbitrary caller without a reputation or legitimate product/service to share with the caller.

There are generally limited tools available to demonstrate that the call is likely to be a scam or spam caller, or, a reputable caller, especially in real-time, so a caller can quickly decide whether to answer the call, drop the call, block the call, etc. With approximately 90 percent of business calls going unanswered, both ends users and callers require more advanced strategies for identifying callers and making informed decisions regarding whether to answer a call.

SUMMARY

Example embodiments of the present application provide at least a method that includes at least one of identifying an incoming communication via a communication processing device, identifying communication source attributes associated with a communication source of the incoming communication, retrieving one or more communication routing conditions from a communication recipient profile associated with an intended recipient device identified by the incoming communication, and determining whether to route the incoming communication to the intended recipient device or an automated communication management device based on the communication source attributes and the one or more communication routing conditions.

Another example embodiment may include an apparatus that includes a processor configured to identify an incoming communication via a communication processing device, identify communication source attributes associated with a communication source of the incoming communication, retrieve one or more communication routing conditions from a communication recipient profile associated with an intended recipient device identified by the incoming communication, and determine whether to route the incoming communication to the intended recipient device or an automated communication management device based on the communication source attributes and the one or more communication routing conditions.

Another example embodiment may include a non-transitory computer readable storage medium configured to store instructions that when executed cause a processor to perform one or more of identifying an incoming communication via a communication processing device, identifying communication source attributes associated with a communication source of the incoming communication, retrieving one or more communication routing conditions from a communication recipient profile associated with an intended recipient device identified by the incoming communication, and determining whether to route the incoming communication to the intended recipient device or an automated communication management device based on the communication source attributes and the one or more communication routing conditions.

Still another example embodiment may include a method that includes one or more of identifying an incoming call via a communication processing device, terminating the incoming call at a call management device, identifying one or more caller attributes received with the incoming call, comparing the one or more caller attributes to one or more call recipient preferences stored in a call recipient profile, and transmitting a notification, via the call management device, to a call recipient device based on the one or more caller attributes and the one or more call recipient preferences.

Yet another example embodiment may include an apparatus that includes a processor configured to identify an incoming call via a communication processing device, terminate the incoming call at a call management device, identify one or more caller attributes received with the incoming call, compare the one or more caller attributes to one or more call recipient preferences stored in a call recipient profile, and a transmitter configured to transmit a notification, via the call management device, to a call recipient device based on the one or more caller attributes and the one or more call recipient preferences.

Still another example embodiment may include a non-transitory computer readable storage medium configured to store instructions that when executed cause a processor to perform identifying an incoming call via a communication processing device, terminating the incoming call at a call management device, identifying one or more caller attributes received with the incoming call, comparing the one or more caller attributes to one or more call recipient preferences stored in a call recipient profile, and transmitting a notification, via the call management device, to a call recipient device based on the one or more caller attributes and the one or more call recipient preferences.

DETAILED DESCRIPTION

Figure 1A:
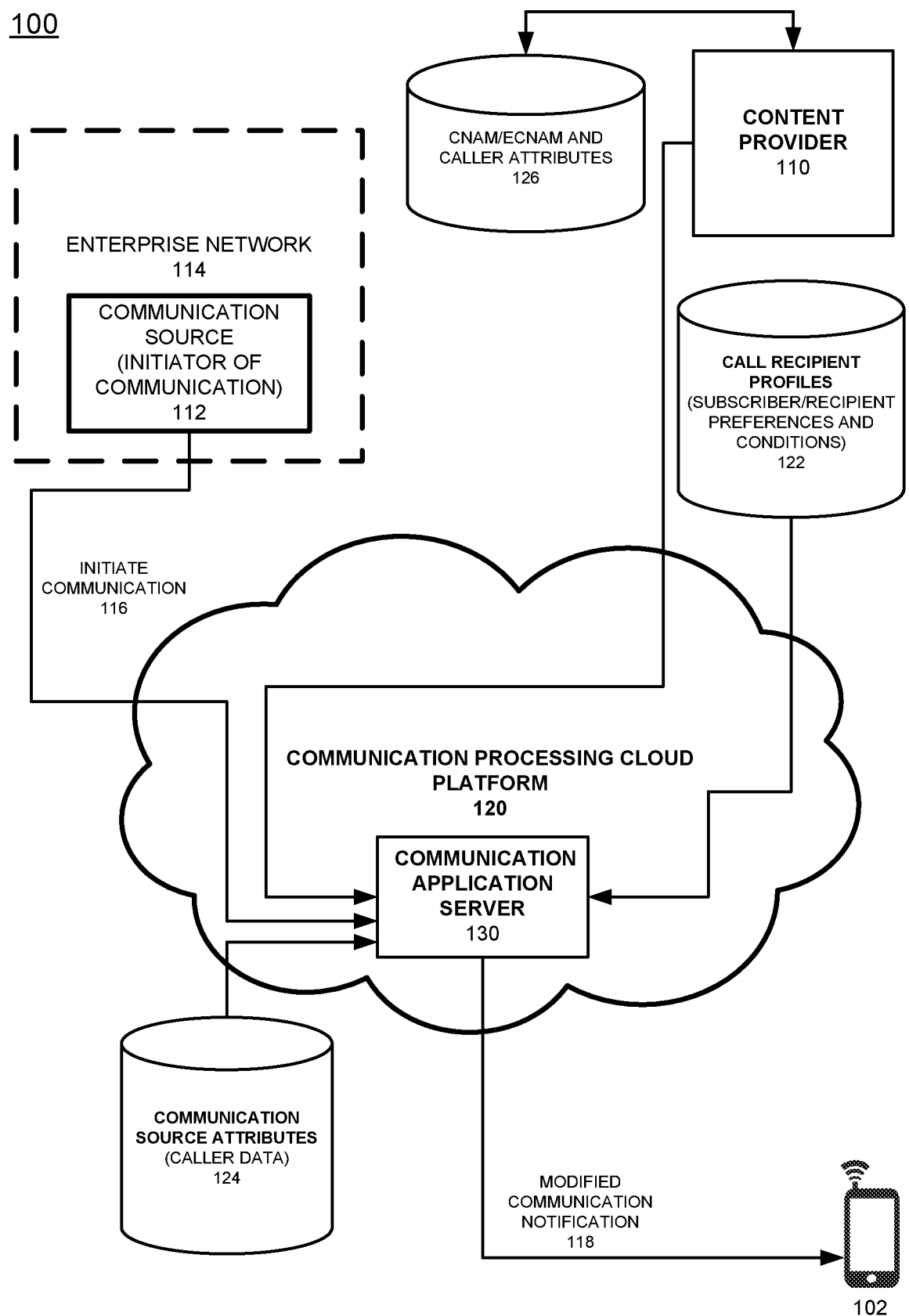
FIG. 1A illustrates an example communication management network configuration for conditional communication forwarding according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide communication management for calls and other communications (e.g., messages, short message service (SMS) data, etc.). In one example, a new communication initiated by a particular caller/initiator may be intercepted and forwarded to a communication management device which is in the cloud and is configured to determine whether to allow a call, block a call, require certain CNAM data, require certain ECNAM data, apply user preferences of the intended recipient, etc. The communication management may result in a blocked call, a straight to voicemail call forwarding, a notification being sent to notify the recipient of the call, etc. Also, content management of content in associations with communications (CNAM/ECNAM data) to and from mobile device users may be customized and specific according to user profiles 122 which identify preferences for the types of enhanced data to receive, the types of calls to permit and not permit, etc.

One example embodiment may include a cloud service which manages a call termination and provides options contemporaneously with the cloud service maintain the call and notifying the end user device. In one example, a hardware store may be automatically calling a user device to have a delivery confirmed, the cloud server may answer and suspend the call pending further routing functions, an automated message may be played, such as "we are trying to locate your call recipient" along with playing music to keep the caller interested, or in the case of automation, to provide a feedback cue for maintaining the all, such as continuous audio. The call recipient may have their profile accessed and used to match the attributes of the caller to determine how to finalize the call connection process.

In another example embodiment, a call/communication may arrive at the call processing server, certain data present with the communication, certain data which is not present with the communication and any other data may be used by the call processing device in the cloud in an attempt to identify the calling party, such as CNAM data, registered scammer confirmation, enhanced CNAM data, etc. Then, the attributes identified from that call data analysis are used to generate a decision which matches the identified attributes to the user's preferences for how the call should be handled. For example, a user may order many deliveries from a particular hardware store and may be to select certain enhanced CNAM data that should be forwarded based on a call to the user's call device so as not to miss a delivery. However, the need to permit the call in its entirety may be unnecessary since modified information sharing may provide ample call related data for call management purposes.

FIG. 1A illustrates an example communication management network configuration 100 according to example embodiments. Referring to FIG. 1A, the content provider 110 is a server and/or database which stores and manages content, such as images, word strings/phrases, URL links and other data that is sent to one or more end user devices, such as mobile device(s) 102 as part of a CNAM/ECNAM data communication effort. The content provider 110 may assign the caller identification name (CNAM) data, such as data stored in a database 126, to certain callers which are registered to use the enhanced data services. Certain enterprise entities may desire to have enhanced data shared with their potential customers.

In operation, an enterprise entity 114 may have its own communication platform 112 to forward calls and/or messages to certain entities. For example, certain calling number(s) ('A' numbers) may be used to call/message any called numbers or 'B' numbers associated with the end user devices. The replacement CNAMs may be assigned through a portal application programming interface (API). The 'A' number party may be an enterprise entity network 114, which may include a call server or other calling entity, such as a third party responsible for managing communications and content pairing, CNAM data and other data shared with the called entities 102.

When a new communication is initiated 116, the communication processing platform 120 may include one or more servers 130 which are dedicated to processing the communication data to determine how to manage the communication based on the end user preferences. The server 130 may provide an interception function for calls sent from the enterprise which require a notification modification or added CNAM/ECNAM data. For example, an end user device 102 may want calls received to be sent to the device as a text message identifying a call and including certain portions of the CNAM/ECNAM data, omitting certain portions of the CNAM/ECNAM data and perhaps an option to drop/answer/re-route the call without any specific action taken by the end user. A carrier network may be integrated with the enterprise calls sent to and from the cloud server 130.

In one example, the call content associated with a call may be updated according to a call campaign effort to share advertising data and other content with the called devices 102. The results of the calls sent may be provided as feedback in an updated telemetry format, which includes calls answered, call times, content selected (i.e., URLs, video, etc.). A call campaign may include calling various 'B' numbers for various purposes such as updates to existing memberships, new offers and subscriptions, etc. The term 'CNAM' may include basic 15-character alphanumeric data or may be referring to an electronic CNAM (ECNAM), which may include images, video, audio, weblinks, characters in excess of 15 characters, etc. Use of the term CNAM in this specification may be associated with CNAM and/or ECNAM interpretations.

Once the communication has been intercepted and caller/source attributes 124 are paired with the communication, the modified communication 118 may include a transformation from an original communication (e.g., call with various ECNAM data), to a SMS message with only a portion of the ECNAM data, other data is blocked including the call. The message may have a capability to answer the call which may be ongoing and may include a timer, such as a thirty second countdown that is demonstrated in the SMS message along with a logo or a single word or phrase as compared to other data which is sent with the original communication.

Figure 1B:
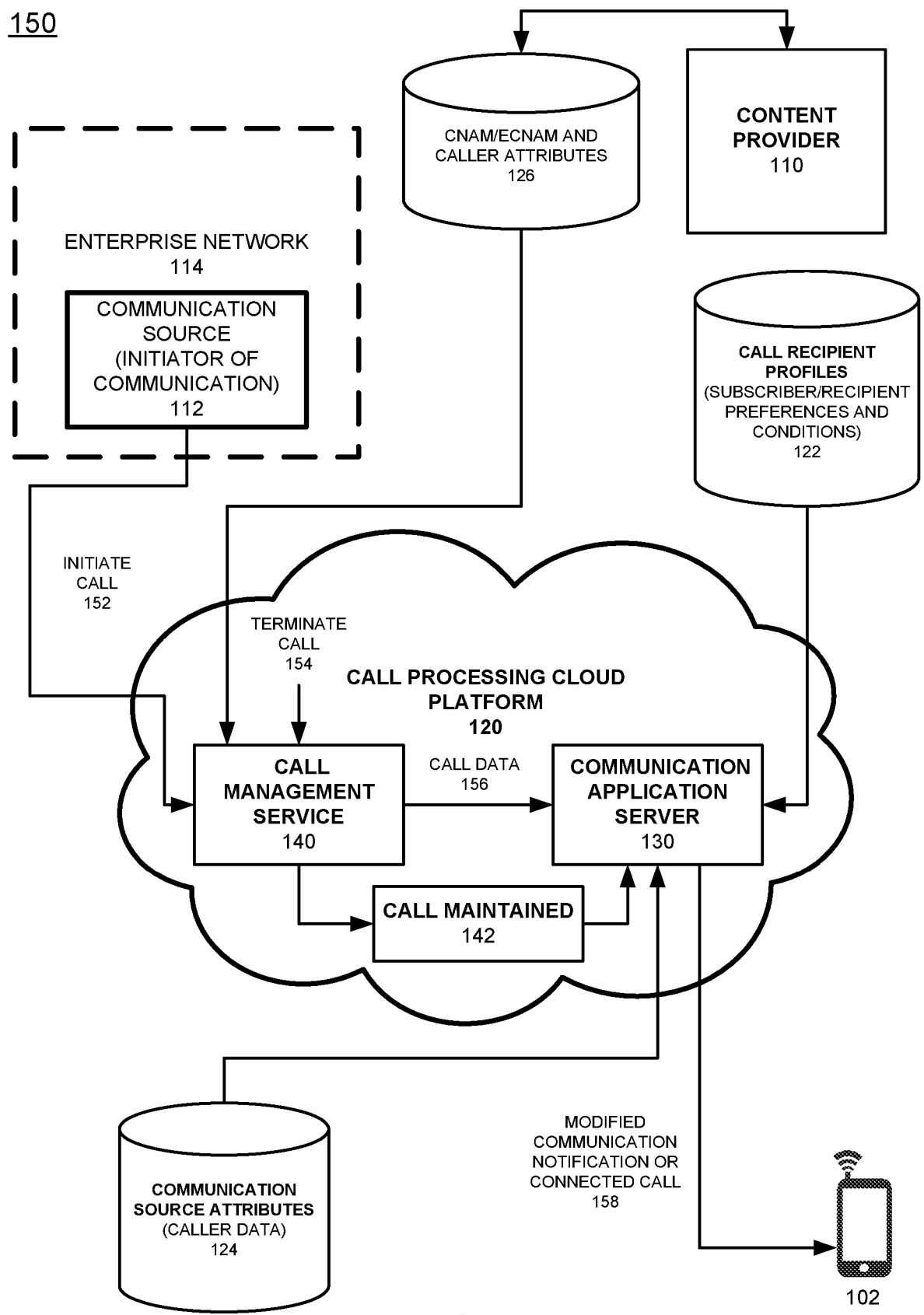
FIG. 1B illustrates an example communication management network configuration for conditional communication forwarding with cloud call termination according to example embodiments.

FIG. 1B illustrates an example communication management network configuration for conditional communication forwarding with cloud call termination according to example embodiments. Referring to FIG. 1B, the configuration 150 may demonstrate another example where the cloud platform 120 terminates a call and suspends a call connection pending additional notification arrangements with the end user device 102. In this example, a call is initiated 152 which is then terminated 154 in the cloud at a call management server 140 which notifies an application server 130 that the call is received and is being maintained 142 pending additional processing decisions. Once the call is terminated, the call data 156 received with the call along with intended recipient profile information 122, caller attribute information 124, and decision made about the caller integrity can lead to a specific outcome, such as a modified communication 158 which includes some or all of the original call data or even a different format.

Figure 2:
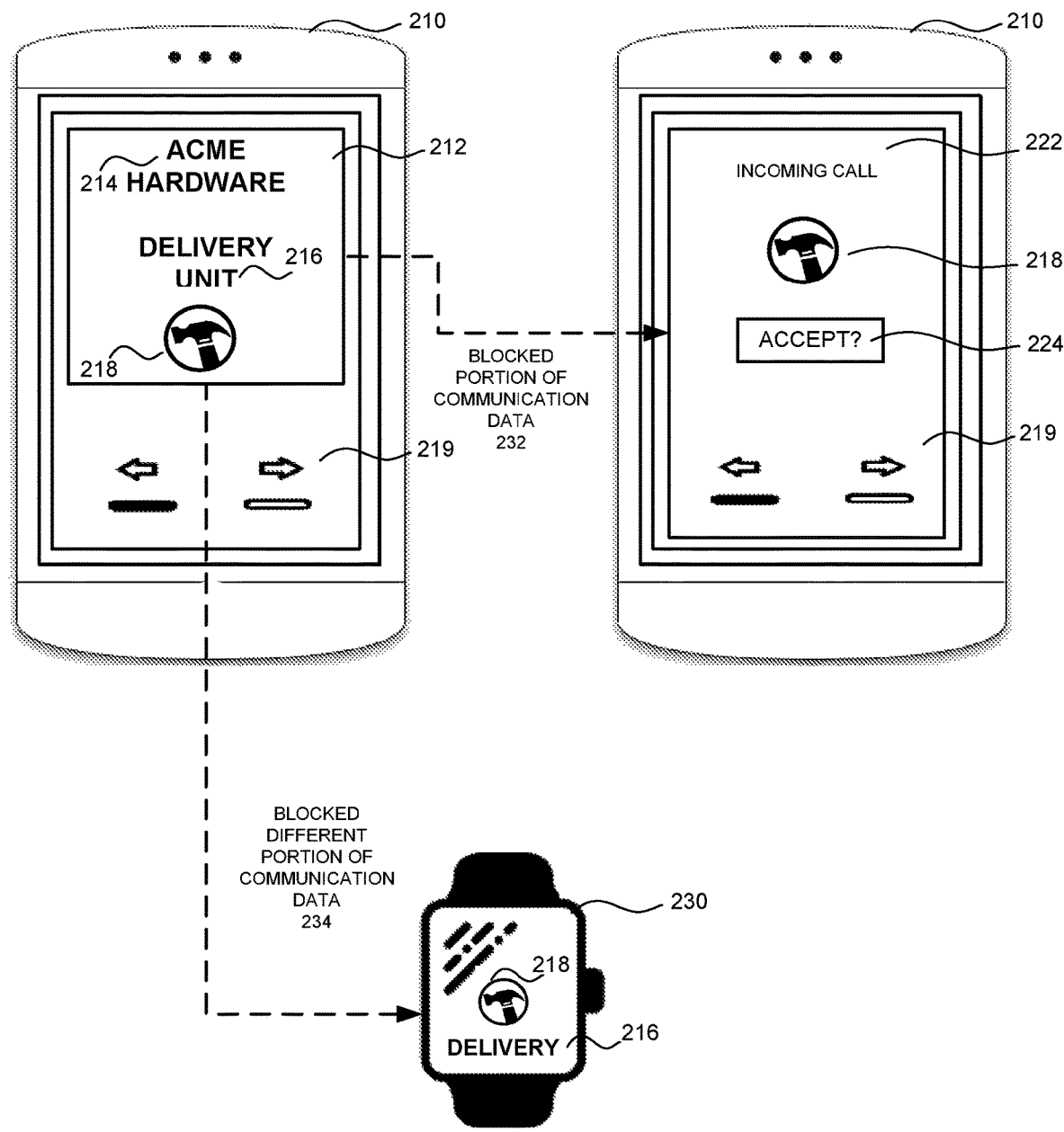
FIG. 2 illustrates a user device graphical user interface of a customized call content configuration according to example embodiments.

FIG. 2 illustrates a user device graphical user interface of a customized call content configuration according to example embodiments. Referring to FIG. 2, the example provides a caller as a hardware store 'ACME' hardware 214, with a sub-notation 216 for the "delivery unit" and a company logo 218, all of which are forms of enhanced data. The first example device 210 has all those portions of enhanced data received with no preferences for blocking or limiting 232 such data. The user may then use the swipe arrow interface option 219 to accept or reject the call. In another example, the call data that is sent to the user device may include an incoming call notification 222 with only the logo 218 being permitted to be viewed for call acceptance 224 or rejection. The use device profile may indicate any type of call treatment option to limit the amount of information that is sent to the end user device and for certain requirements, such as only for callers which are registered as known trusted callers on a particular list. In another example a smart watch 230 that is linked to the smartphone may only show the logo 218 and the word delivery 216 which is a truncated version 234 of the original content. This enables a smart watch owner to quickly identify the caller and whether to permit the call or not.

Figure 3:
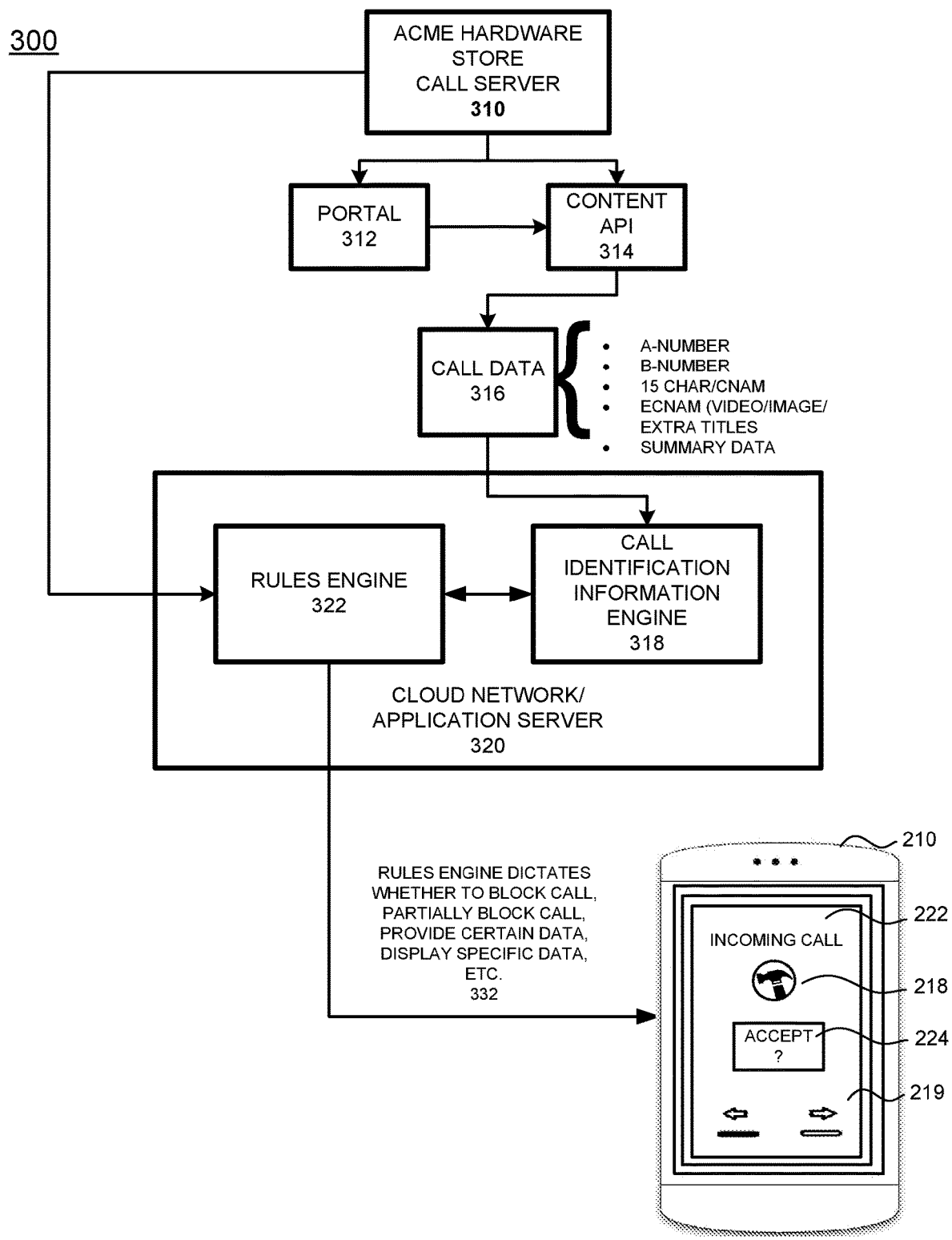
FIG. 3 illustrates a logic diagram of a process for identifying caller data and forwarding customized communication information to a mobile device.

FIG. 3 illustrates a logic diagram of a process for identifying caller data and forwarding customized communication information to a mobile device. Referring to FIG. 3, the configuration 300 includes a call server 310 which represents the enterprise entity and the communication management process. When a call is placed to a customer, a portal 312 accesses a content API 314 to retrieve the enhanced content that is shared with the call. The call data may include the 'A' number of the calling entity, the 'B' number of the callee entity, the 15-character CNAM, the ENCAM data, extra text and any summary of information necessary to share the content with end user. The could application server 320 may include a rules engine 322 which decides whether the caller is reputable based on one or more attributes such as a known number, a registered number or name and other criteria. The call identification information engine 318 may pair the calling party information with the call communication based on the rules. When the decision is made to route the call, the call information may be routed with some, all or a specific arrangement as a message or call 332 to the end user device.

Figure 4A:
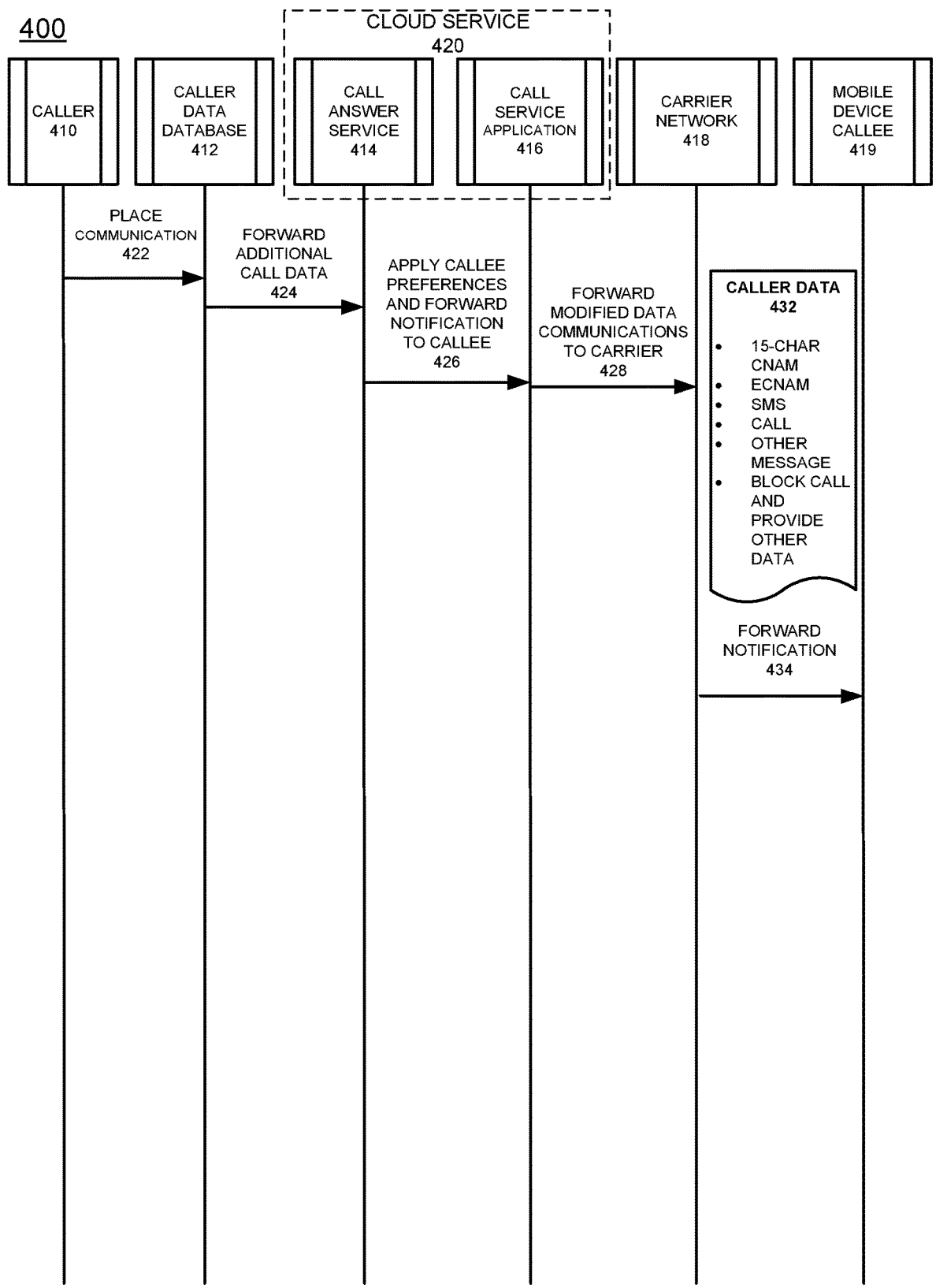
FIG. 4A illustrates an example system network flow diagram of a cloud based service for managing incoming communications according to example embodiments.

FIG. 4A illustrates an example system network flow diagram of a cloud based service for managing incoming communications according to example embodiments. Referring to FIG. 4A, the system configuration 400 may include a caller 410 which places a communication 422 such as a call or message 422 to the callee device 419. The caller data database 412 may be referenced to retrieve information about the caller, such as CNAM/ECNAM data, registered/trusted user data, etc. and such information is forwarded 424 to the call answering service 414 of the cloud services 420. The communication is received and processed to identify the information associated with the caller, such as what CNAM data or enhanced data is received, whether the caller is a known trusted entity or not, etc. The callee information may be retrieved and applied as well to determine how to forward the communication or not forward the communication.

The preferences associated with the callee profile can be used to drop the call, ensure the caller is reputable, only permit certain CNAM/ECNAM data, block the call or partially block the call by permitting a text message which identifies the call and certain enhanced data but does not permit the call, etc. The preferences are applied 426 and the call is forwarded to a service application which is used to route the communication/modified communication to the end user. For example, when the preferences indicate that only a logo or a part of the CNAM data should be forwarded via a text message while the call is dropped or sent to voicemail, then the modified communication 428 will be sent to the carrier network 418 via the service application 416. The caller data 432 that is included with the communication may include one or more of the caller data types depending on the user profile preferences and requirements. The modified data is forwarded 434 to the end user device 419.

Figure 4B:
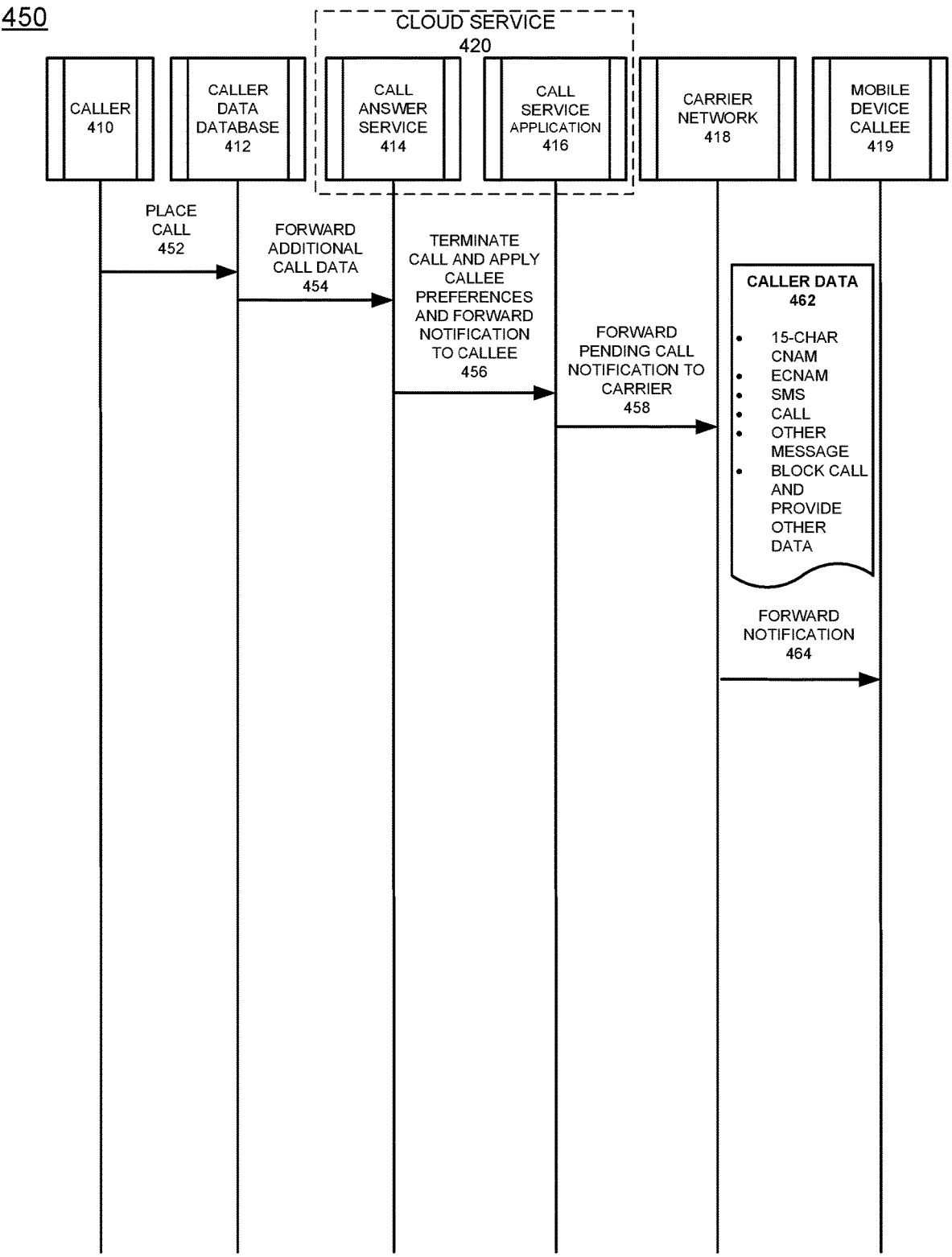
FIG. 4B illustrates an example system network flow diagram of a cloud based service for terminating calls in the cloud and managing subsequent communications according to example embodiments.

FIG. 4B illustrates an example system network flow diagram of a cloud based service for terminating calls in the cloud and managing subsequent communications according to example embodiments. Referring to FIG. 4B, the configuration 450 includes a similar example to the example in FIG. 4A, however, this configuration provides for cloud call termination, and when a call is placed 452, the forwarded call and call data 454 is terminated in the cloud and the preferences and attributes are identified 456 to determine how to manage the call and how to notify the callee device 419. The pending call data is forwarded to the callee's carrier 458 so the caller data 462 and call can be forwarded 462 in a manner consistent with the callee preferences.

Figure 5A:
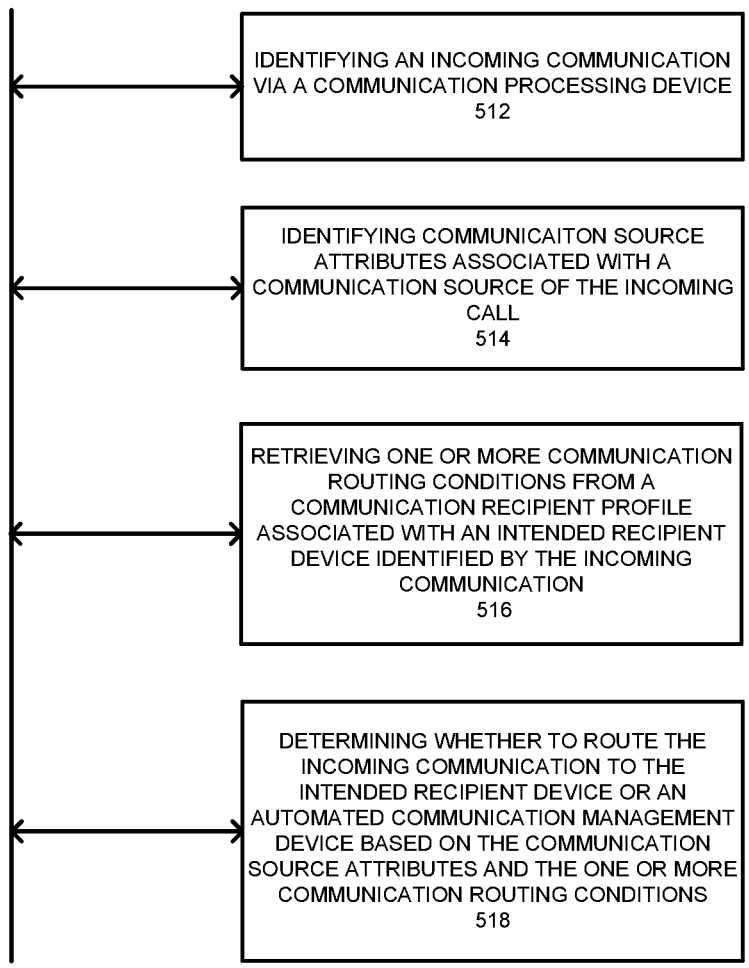
FIG. 5A illustrates an example flow diagram of a process for managing an incoming communication according to example embodiments.

FIG. 5A illustrates an example flow diagram of a process for managing an incoming communication according to example embodiments. Referring to FIG. 5A, the process 500 may include identifying an incoming communication via a communication processing device 512, identifying communication source attributes associated with a communication source of the incoming communication 514, retrieving one or more communication routing conditions from a communication recipient profile associated with an intended recipient device identified by the incoming communication 516, and determining whether to route the incoming communication to the intended recipient device or an automated communication management device based on the communication source attributes and the one or more communication routing conditions 518.

The incoming communication is one or more of a call and a data message. The process may also include routing the incoming communication to the intended recipient device when the communication source attributes indicate a source type that is accepted by the one or more communication routing conditions. For example, a source that is known and trusted as identified from a list of trusted parties may be identified as an attribute that is acceptable for forwarding the call along to the end user device. A source that is not known may be required to have its enhanced data forwarded as a text message so the user device can avoid a potential scam call until the end user decides to permit the call or not. For example, a company logo in a text message may be a second leg of a terminated call and the user selecting to accept the call thereafter could be a third leg that actually connects the call. The process may also include routing the incoming communication to the automated communication management device when the communication source attributes indicate a source type that is not accepted by the one or more communication routing conditions, and performing one or more of forwarding the incoming communication to voice mail or blocking the incoming communication when the source type is not accepted by the one or more communication routing conditions. The process may also include determining the communication source attributes include one or more of a caller identification name (CNAM) and an enhanced caller identification name (ECNAM), and determining the communication source attributes satisfy the one or more communication routing conditions. The process may also include blocking a portion of the incoming communication when only a portion of the communication routing conditions are satisfied, and forwarding a notification to the intended recipient device comprising another portion of the incoming communication.

Figure 5B:
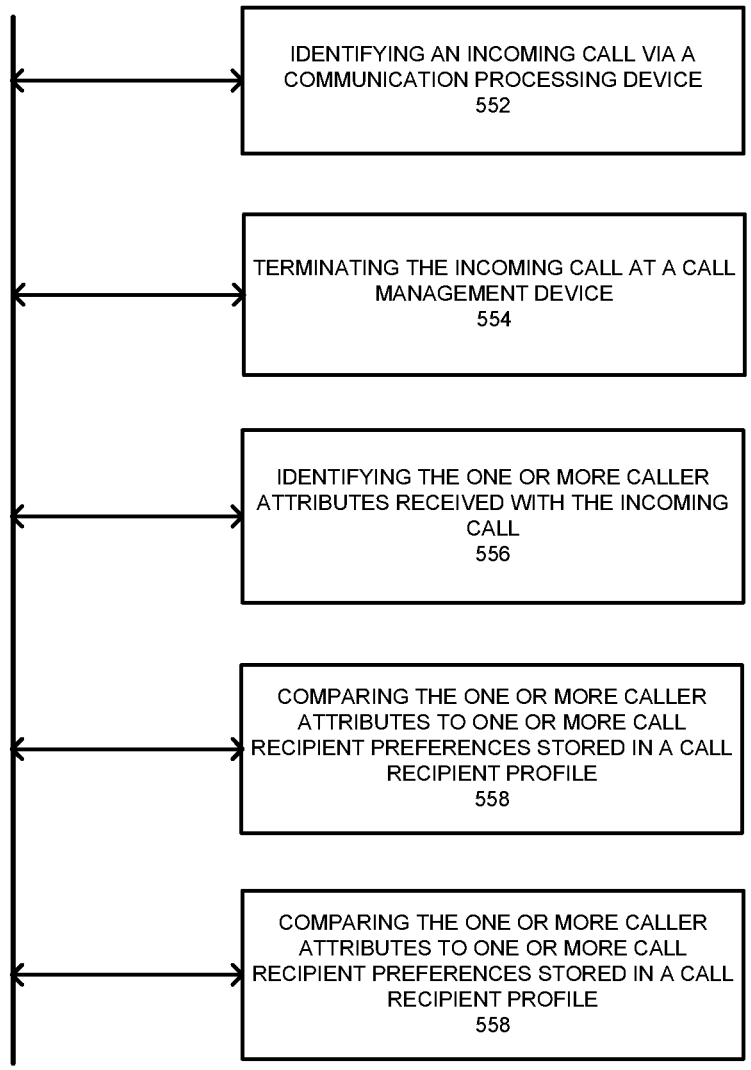
FIG. 5B illustrates an example flow diagram of another process for managing an incoming communication according to example embodiments.

FIG. 5B illustrates an example flow diagram of another process for managing an incoming communication according to example embodiments. Referring to FIG. 5B, the process 550 may include identifying an incoming call via a communication processing device 552, terminating the incoming call at a call management device 554, identifying one or more caller attributes received with the incoming call 554, comparing the one or more caller attributes to one or more call recipient preferences stored in a call recipient profile 556, and transmitting a notification, via the call management device, to a call recipient device based on the one or more caller attributes and the one or more call recipient preferences 558.

The process may also include determining the one or more caller attributes include one or more of a caller identification name (CNAM) and an enhanced caller identification name (ECNAM), and responsive to identifying the caller attributes include one or more of the CNAM and the ECNAM, transmitting the notification as a first type of notification identified from the one or more call recipient preferences. The notification may include one of a call, a message, and a voicemail. The message may include a portion of ECNAM data based on the ECNAM data identified. The process may also include maintaining the incoming call as an active call for a predetermined amount of time after the incoming call has been terminated, for example, the call may be maintained as active with a line hold for 30 seconds to see if the callee is willing to answer the call or not based on the notification provided to the user. The process may also include determining the caller attributes include a known caller identity identified from a trusted list of callers or an untrusted list of callers. The process may also include transmitting the notification, while the incoming call is active, as a first type when the known caller identity is trusted and a second type when the caller identity is untrusted. When the known caller identity is trusted, transmitting the notification with a confirmation identifying the caller as trusted, receiving a call answer confirmation from the call recipient device, and responsive to receiving the call answer confirmation, connecting the terminated call with the call recipient device.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
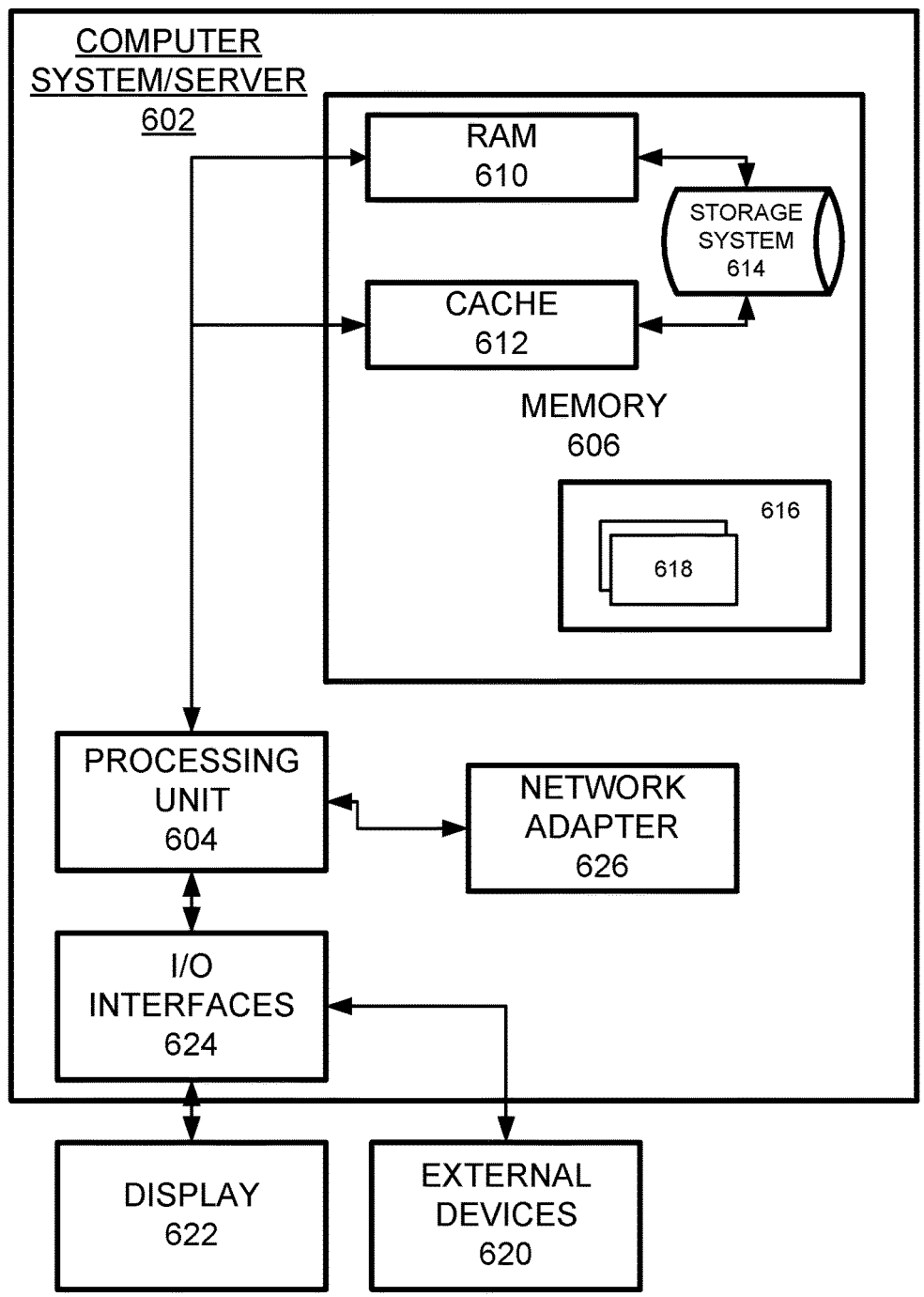
FIG. 6 illustrates an example network entity device configured to store instructions, software, and corresponding hardware for executing the same, according to example embodiments of the present application.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising
identifying an incoming call via a communication processing device that is terminated at a call management device;
transmitting a notification, via the call management device to a call recipient device, while the incoming call is active, as a first type when the incoming call is trusted and a second type when the incoming call is untrusted;
determining one or more caller attributes of the incoming call by identifying a known caller identity from a trusted list of callers or an untrusted list of callers, wherein the one or more caller attributes comprise one or more of a caller identification name (CNAM) or an enhanced caller identification name (ECNAM); and
wherein the notification is transmitted as the first type of notification identified from one or more call recipient preferences.

2. The method of claim 1, wherein the notification comprises one of a call, a message, and a voicemail.

3. The method of claim 2, wherein the message comprises a portion of ECNAM data based on the ECNAM.

4. The method of claim 1, comprising
determining the one or more caller attributes that comprise the known caller identity identified from the trusted list of callers or the untrusted list of callers.

5. The method of claim 1, comprising terminating the incoming call at the call management device.

6. The method of claim 1, comprising
when the incoming call is trusted, transmitting the notification with a confirmation identifying a caller of the incoming call as trusted;
receiving a call answer confirmation from the call recipient device; and
responsive to receiving the call answer confirmation, connecting the terminated call with the call recipient device.

7. An apparatus comprising
a processor configured to
identify an incoming call via a communication processing device that is terminated at a call management device; and
a transmitter configured to transmit a notification, via the call management device, to a call recipient device, while the incoming call is active, as a first type when the incoming call is trusted and a second type when the incoming call is untrusted;
wherein the processor is further configured to determine one or more caller attributes of the incoming call by ana identification of a known caller identity from a trusted list of callers or an untrusted list of callers, wherein the one or more caller attributes comprise one or more of a caller identification name (CNAM) or an enhanced caller identification name (ECNAM); and
wherein the notification is transmitted as the first type of notification identified from one or more call recipient preferences.

8. The apparatus of claim 7, wherein the notification comprises one of a call, a message, and a voicemail.

9. The apparatus of claim 8, wherein the message comprises a portion of ECNAM data based on the ECNAM.

10. The apparatus of claim 7, wherein the processor is further configured to
determine the one or more caller attributes that comprise the known caller identity identified from the trusted list of callers or the untrusted list of callers.

11. The apparatus of claim 7, wherein the processor is further configured to terminate the incoming call at the call management device.

12. The apparatus of claim 7, wherein when the incoming call is trusted, the transmitter is configured to transmit the notification with a confirmation identifying a caller of the incoming call as trusted, and receive a call answer confirmation from the call recipient device, and responsive to the call answer confirmation that is received, the processor is configured to connect the terminated call with the call recipient device.

13. A non-transitory computer readable storage medium configured to store instructions that when executed cause a processor to perform:
 identifying an incoming call via a communication processing device that is terminated at a call management device;
 and
 transmitting a notification, via the call management device, to a call recipient device while the incoming call is active, as a first type when the incoming call is trusted and a second type when the incoming call is untrusted;
 determining one or more caller attributes of the incoming call by identifying a known caller identity from a trusted list of callers or an untrusted list of callers, wherein the one or more caller attributes comprise one or more of a caller identification name (CNAM) or an enhanced caller identification name (ECNAM); and
 wherein the notification is transmitted as the first type of notification identified from one or more call recipient preferences.

14. The non-transitory computer readable storage medium of claim 13, wherein the notification comprises one of a call, a message, and a voicemail.

15. The non-transitory computer readable storage medium of claim 14, wherein the message comprises a portion of ECNAM data based on the ECNAM.

16. The non-transitory computer readable storage medium of claim 13, wherein the processor is further configured to perform:
 determining the one or more caller attributes that comprise the known caller identity identified from the trusted list of callers or the untrusted list of callers.

17. The non-transitory computer readable storage medium of claim 13, wherein the processor is further configured to perform terminating the incoming call at the call management device.

* * * * *